Figure 1:
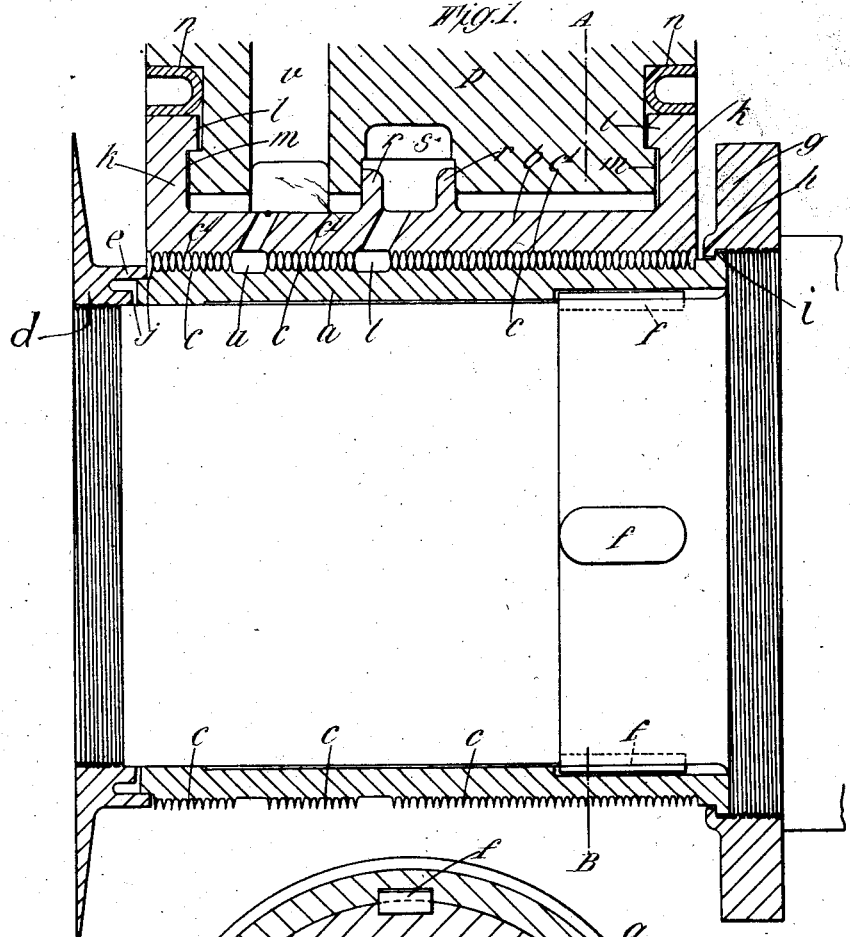

Sept. 13, 1927.

B. POCHOBRADSKY 1,642,085

PACKING GLAND FOR ELASTIC FLUID TURBINES OR THE LIKE

Filed Oct. 7, 1924        2 Sheets-Sheet 1

Inventor.
Bedrich Pochobradsky
M. H. Lockwood
Attorney.

Sept. 13, 1927.
B. POCHOBRADSKY
1,642,085
PACKING GLAND FOR ELASTIC FLUID TURBINES OR THE LIKE
Filed Oct. 7, 1924    2 Sheets-Sheet 2
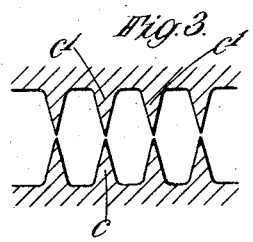
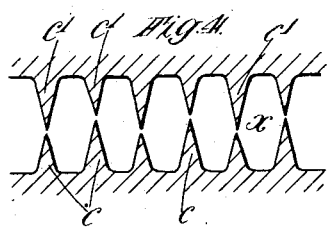
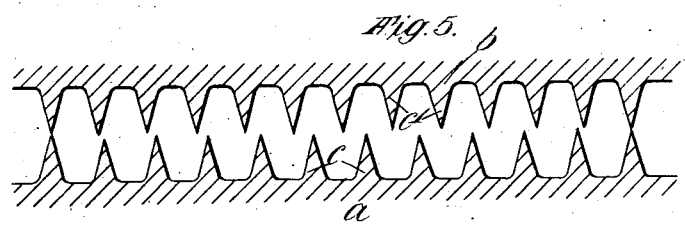
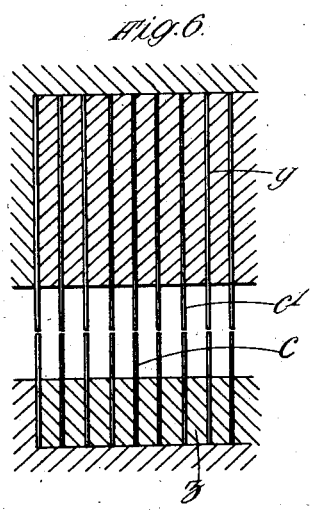
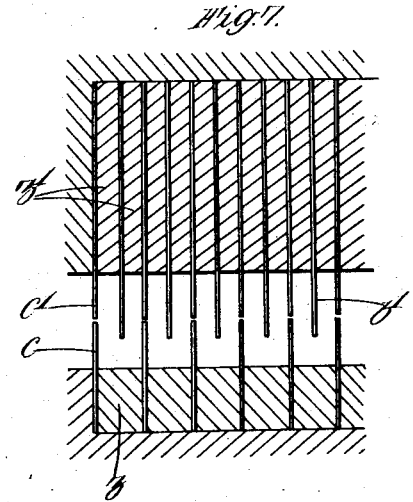
Inventor.
Bedrich Pochobradsky
M.H. Lockwood
Attorney.

Patented Sept. 13, 1927.

1,642,085

UNITED STATES PATENT OFFICE.

BEDRICH POCHOBRADSKY, OF SIDCUP, ENGLAND.

PACKING GLAND FOR ELASTIC-FLUID TURBINES OR THE LIKE.

Application filed October 7, 1924, Serial No. 742,096, and in Great Britain October 20, 1923.

This invention relates to packing glands of the labyrinth type suitable for machinery with rotating parts, such as elastic fluid turbines, turbo-compressors, water turbines, water pumps or the like, and more particularly to packing glands intended to be used to reduce leakage which is liable to take place at the space where shafts pass through casings or diaphragms, or between the rotary and the stationary parts of the machine.

According to the invention a packing gland of the labyrinth type has a number of very small clearances, in which the leaking medium acquires velocity which is to a large extent destroyed in the larger spaces which follow each small clearance.

In packing glands of the labyrinth type so far known the small clearances have been formed by plain surfaces or by a sharp edge and a plain surface, but it has been found that owing to the plain surfaces any accidental contact has resulted in substantial damage to the glands and consequent stoppage of the machines. According to the present invention, however, each of the small clearances is formed preferably by two sharp edges in close proximity, one sharp edge being formed on a ring or disc attached to a rotating part of the machine, the other sharp edge being formed on a ring or disc attached to a stationary part of the machine. The said rings or discs have a large surface so that any heat generated by contact of sharp edges can be transmitted readily through the large surfaces from the metal to the leaking medium.

Since the annular blades are provided with sharp edges it can be safely arranged that the edges are in close proximity, since if they do touch they are not damaged seriously but merely blunted. Moreover, in the event of the sharp edges touching, the heat developed at the points of contact is not large, since the resisting force of the edges is not great, and it therefore follows that little heat has to be dissipated. Besides, since the clearance between the edges of the blades is so small the cooling effect of the steam on the edges is large as it flows from one space past the intervening sharp blade edges with relatively high velocity to enter the next space between sets of blades. As the steam enters the space between sets of blades its progress is checked and its velocity largely destroyed since the exit therefrom is constricted, and so the steam flows in eddies over the large surfaces of the blades and cools them effectively in the event of their having been heated.

In order to make the destruction of this velocity as efficient as possible, the direction of flow of the leaking medium issuing out of the small clearances is altered before it reaches the next clearance. This may be done either by the clearances being so arranged that the next clearance does not lie in the direction of the flow from the preceding clearance, or by the arrangement between the two successive clearances of a baffle plate or baffle ring which causes a change in the direction of the flow of the leaking medium.

The sharp edges may be formed on rings turned out of a solid brush or disc, or such rings may be made separately and built up into a packing gland by means of distance rings fastened securely to a box attached either to the stationary part or the rotating part of the machine. Where the gland is subjected to high temperatures causing considerable expansion, it is preferable to make the stationary rings and the rotating rings with the sharp edges of the same material, or of materials having approximately the same coefficient of expansion, so that the clearances will remain substantially constant whatever may be the temperature produced by the steam flowing through the gland. Further, the rotating part of the gland is attached to the rotating part of the machine in such a way that the gland portion can expand freely in all directions, remaining concentric with the rotating part of the machine. This may be achieved by means of thin rings connecting the gland portion with the machine portion, the rings being flexible. Similarly, the stationary part of the gland is not attached rigidly to the stationary portion of the machine, but by means of flexible rings or by means of four keys arranged crosswise, so that the stationary part of the gland can expand freely in all directions remaining concentric with the rotating part of the gland.

Figure 2:
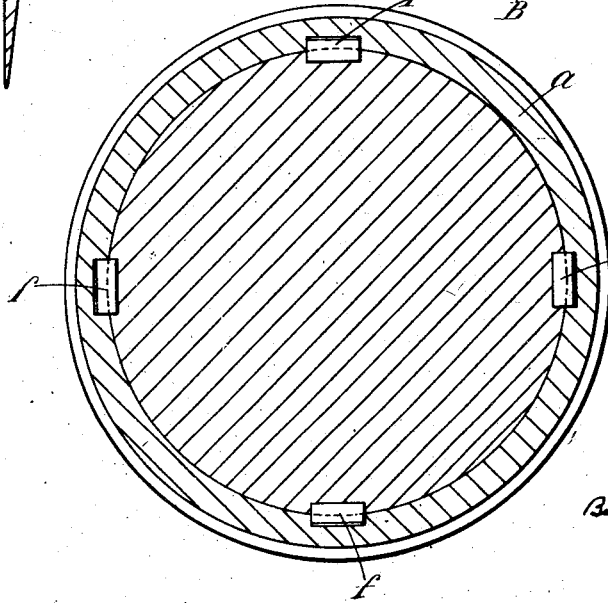

The invention will be described with reference to the accompanying drawings, of which Figure 1 is a sectional view of a packing gland. Figure 2 shows the section A—B through the shaft and the portion of the gland attached to the shaft. Figures 3, 4, 5, 6 and 7 show various constructions of the labyrinths themselves.

Referring to Figure 1, *a* is a sleeve attached flexibly to the shaft; *b* is a stationary part of the gland attached flexibly to the casing. The sleeve *a* is provided with rings *c* having sharp edges. The sleeve *b* is provided with rings *c'* provided similarly with sharp edges. Small clearances are formed between the sharp edges of rings *c* and *c'*. These clearances are not discernible in Fig. 1, but may be seen clearly in Fig. 3, which shows some of the blades of Fig. 1 enlarged. The rings *c* and *c'* are dimensioned in such a way that their surface is very large in proportion to the sharp edges, so that in case of contact only the sharp edges come in contact and on account of very small surfaces being in contact, a relatively small amount of heat is generated; the small amount of heat is dissipated by the relatively large surfaces of the rings. In this type of gland it is impossible for contact to take place on large surfaces and therefore it is impossible for a large amount of heat to be generated through friction.

The sleeve *c* is attached flexibly to the shaft; at one end a nut *d* is screwed on the shaft, this nut being provided with a thin ring *e*. This thin ring surrounds at its free end the end of the sleeve. At the other end the sleeve is attached to the shaft by means of four keys *f* shown also in Figure 2. These keys prevent the rotation of the sleeve on the shaft; further, the keys *f* are arranged crosswise so that the sleeve *a* can expand radially with complete freedom while its centre line coincides all the time with the centre line of the shaft. The sleeve *a* is further fixed at one end longitudinally to the shaft by means of a nut *g* screwed on the shaft and provided with a small retaining ring *h* resting against a similar retaining ring *i* on the sleeve *a*.

Clearances *j* are provided between the nut *d* with its ring *e* and the sleeve *a* so that the sleeve *a* can expand longitudinally with complete freedom from the ring *h* in accordance with the relative temperatures of the sleeve and the shaft itself. This construction allows free expansion of the sleeve *a* in a longitudinal direction irrespective of the temperature of the shaft, since the sleeve is retained at one end only by the flange *h*, which prevents the sleeve from being capable of bodily movement in an axial direction along the shaft. The construction also allows substantial freedom of expansion of the sleeve radially, since between the sleeve *a* and the radially inner face of the flange *h*, and between the radially outer face of the flange *i* and the radially inner face of the nut *g* are annular spaces allowing of radial expansion; since the keys *f* allow the sleeve freedom of movement in a radial direction; and since a deep annular recess is cut in the nut *d*, the ring *e*, the thickness of which is small compared with the thickness of the body of the nut, may follow the movements of the end portion of the sleeve *a* as it expands or contracts radially.

The stationary part *b* of the gland is also connected by flexible means to the casing. It has flanges *k*, each flange being provided with rings *l*. These rings surround similar rings *m* on the casing. This arrangement makes the stationary part of the gland concentric with the casing and also with the shaft and naturally with the gland sleeve *a*. In suitable recesses in the casing are lodged flexible rings *n* which press against the stationary part *b* concentrically. These rings are prevented from falling out by shields or some other means. Usually the stationary part *b* has a higher temperature than the casing *p*. It will therefore expand more than the casing. In expanding radially the rings *n* would be compressed but as these rings are uniform all round the stationary part *b* would remain concentric while expanding freely in the radial direction. In longitudinal direction the stationary part *b* is fixed by means of rings *r* in the casing. The expansion in longitudinal direction takes place in both directions away from these rings. The gland is sealed by steam from inside the casing, or should the pressure be lower than the pressure outside the casing, steam is admitted to the space *s* from which it reaches through openings the space *t* in the labyrinths and seals the gland. In the space *t* the steam pressure is maintained slightly above the pressure outside of the casing, the steam will therefore leak also through a number of labyrinths to the space *u* from where it may be taken out through the channel *v* outside of the casing, or any other suitable space.

Figure 3 shows in greater detail the labyrinth of the gland. It will be seen that the small clearances are formed by sharp edges of rings, one being provided on the stationary part, the other on the rotating part of the gland. The edge represents a small fraction of the surface of the rings *c* and *c'*.

Figure 4 represents an alternative construction in which the rings *c* on the sleeve are alternately of larger and smaller diameter, corresponding to ring *c'* on the stationary part of alternately smaller and larger diameter. The steam leaking for instance through the clearance of the first ring does not only fill the space *x* in which the kinetic energy of the steam is destroyed but in addition the next clearance is on a different diameter, so that the flow of leaking steam is baffled.

Figure 5 represents another alternative construction of our invention. The longitudinal spacing of the rings *c* on the sleeve *a* is different from the spacing of rings *c'* on the stationary portion b. It may be that there is a relative movement in the longitudinal direction between the sleeve a and stationary portion b. If such movement takes place the rings c and c' are not exactly opposite; in fact in certain conditions the rings c may be just midway between the rings c' and the leakage would obviously be increased owing to the increased clearances. In this alternative construction this cannot take place. Some of the rings will be opposite, some will have only small clearances and only a comparatively small proportion will have a clearance equal to half the pitch.

In Figure 6 another alternative construction is shown. The rings c and c' are not made out of one piece with the sleeve or the body of the stationary part, but they are formed of thin rings with distance pieces y and z between them. In this manner the same object is achieved as with the construction shown in Figure 3.

In Figure 7 the rings c and c' are made separately and held in one certain position by distance rings.

In order to prevent any steam flow to reach from one clearance to the next clearance directly, baffle plates b' are fixed so that the leaking steam must change its direction of flow before it passes from one clearance to the next clearance.

It should be understood that in principle the constructions described are applicable, not only for packings between the shaft and the casing, but between, for instance, diaphragms and the rotor, or generally between the rotor and stator.

In cases where the pressure on the one side of the packing gland is always higher than the pressure on the other side, such as is the case with diaphragms there is no need to arrange for additional sealing of the glands by means of steam being admitted to intermediate spaces in the gland.

The gland illustrated by way of example in the drawings is suitable for use in cases wherein, owing to substantial changes of temperature occurring at the gland from time to time, the operation of the gland, if mounted directly on the machine parts between which relative motion occurs, would be affected adversely. It is clear that in large glands it is desirable to allow for appreciable axial movement in the case of cylindrical glands, and appreciable radial movement in the case of radial glands, if they are liable to be subjected to considerable changes in temperature.

According to the present invention, the stationary and rotating part of the gland are made of materials having substantially the same temperature expansion; as the temperature over the gland is practically uniform and as the temperature expansion of the metals is substantially the same, the clearances will remain the same independently of the practically uniform temperature prevailing in the gland at any one time.

It should be understood that the present invention is applicable, not only to steam turbines, but generally to elastic fluid turbines, rotary air and gas compressors, rotary pumps and generally to all such rotary machinery where leakages are to be kept within small limits between spaces of higher and lower pressures.

I claim:—

1. A labyrinth packing gland, comprising a rotary member, annular sharp-edged blades projecting from the rotary member, a stationary member, and annular sharp-edged blades which project from the stationary member in a direction substantially parallel to that of the blades projecting from the rotary member, and which are arranged so that, for each member, the sharp edges on that member are situated in closer proximity to the sharp edges on the other member than to any other part of the said other member.

2. A labyrinth packing gland, comprising a rotary member, annular sharp-edged blades projecting from the rotary member, a stationary member, annular sharp-edged blades which project from the stationary member in a direction substantially parallel to that of the blades projecting from the rotary member, and which are arranged so that, for each member, the sharp edges on that member are situated in closer proximity to the sharp edges on the other member than to any other part of the said other member, means which hold the rotary member in position but allow radial expansion thereof, and means which hold the stationary member in position but allow radial expansion thereof.

3. A labyrinth packing gland, comprising a rotary sleeve associated with a shaft, annular sharp-edged blades projecting from the rotary sleeve, a stationary sleeve associated with a stationary support, annular sharp-edged blades which project from the stationary sleeve in a direction substantially parallel to that of the blades projecting from the rotary sleeve, and which are arranged so that their sharp edges are situated in close proximity to the sharp edges of the blades on the rotary sleeve, means for holding the rotary sleeve in position and allowing radial and axial expansion thereof, and means for holding the stationary sleeve in a position concentric with the rotary sleeve, and allowing radial and axial expansion of the said stationary sleeve.

4. A labyrinth packing gland, comprising a rotary sleeve surrounding a shaft, means for holding the sleeve in position and allowing radial and axial expansion thereof, comprising means for drawing the end of the sleeve against a shoulder on the shaft, and at least two keys engaging key ways in the sleeve and shaft and arranged on different diameters of the shaft, annular sharp-edged blades projecting from the rotary sleeve, a stationary sleeve, annular sharp-edged blades which project therefrom in a direction substantially parallel to that of the blades on the rotary sleeve, and which are arranged so that their sharp edges are situated in close proximity to the sharp edges of the latter blades, and means for holding the stationary sleeve in a position concentric with the rotary sleeve and allowing radial and axial expansion of the said stationary sleeve.

5. A labyrinth packing gland, comprising a rotary member, annular sharp-edged blades projecting therefrom, a stationary member, a support for the stationary member, annular sharp-edged blades which project from the stationary member in a direction substantially parallel to that of the blades on the rotary member, and which are arranged so that their sharp edges are situated in close proximity to the sharp edges of the blades on the rotary member, means for holding the rotary member in position, and means comprising flexible rings acting between the stationary member and a portion of the adjacent support, for allowing expansion of the stationary member and holding it correctly positioned relative to the rotary member.

6. A labyrinth packing gland, comprising a rotary member, annular sharp-edged blades projecting from the rotary member, a stationary member of material of substantially the same temperature expansion as that of the rotary member, and annular sharp-edged blades which project from the stationary member in a direction substantially parallel to that of the blades on the rotary member and which are arranged so that, for each member, the sharp edges on that member are situated in closer proximity to the sharp edges on the other member than to any other part of the said other member.

7. A labyrinth packing gland, comprising a rotary member, annular sharp-edged blades, projecting therefrom, a stationary member, and annular sharp-edged blades projecting therefrom in a direction substantially parallel to that of the blades on the rotary member, and which are arranged so that, for each member the sharp edges on that member are situated in closer proximity to the sharp edges on the other member than to any other part of the said other member, and wherein the spacing of the blades on the one member is different from the spacing of the blades on the other member.

BEDRICH POCHOBRADSKY.